United States Patent
Kafle et al.

(10) Patent No.: US 8,503,283 B2
(45) Date of Patent: Aug. 6, 2013

(54) CHANNEL ACCESS PROTOCOL FOR WIRELESS COMMUNICATION

(75) Inventors: Padam Lal Kafle, Coppell, TX (US); Prabodh Varshney, Coppell, TX (US); Kyeong Jin Kim, Irving, TX (US)

(73) Assignee: Nokia Corporation, Espoo (FI)

( * ) Notice: Subject to any disclaimer, the term of this patent is extended or adjusted under 35 U.S.C. 154(b) by 584 days.

(21) Appl. No.: 12/137,874

(22) Filed: Jun. 12, 2008

(65) Prior Publication Data
US 2009/0310692 A1  Dec. 17, 2009

(51) Int. Cl.
*H04J 11/00* (2006.01)
*H04L 5/00* (2006.01)

(52) U.S. Cl.
CPC ................................. *H04L 5/0007* (2013.01)
USPC ............. 370/203; 370/208; 375/260; 455/59; 455/60

(58) Field of Classification Search
None
See application file for complete search history.

(56) References Cited

U.S. PATENT DOCUMENTS

| | | | |
|---|---|---|---|
| 7,042,897 B1 * | 5/2006 | Sivaprakasam et al. | 370/462 |
| 7,184,393 B1 * | 2/2007 | Singh et al. | 370/203 |
| 7,684,333 B1 * | 3/2010 | Dasylva et al. | 370/235.1 |
| 2003/0169681 A1 * | 9/2003 | Li et al. | 370/203 |
| 2004/0081127 A1 * | 4/2004 | Gardner et al. | 370/338 |
| 2004/0264475 A1 * | 12/2004 | Kowalski | 370/395.5 |
| 2005/0135318 A1 * | 6/2005 | Walton et al. | 370/338 |
| 2005/0245258 A1 * | 11/2005 | Classon et al. | 455/434 |
| 2005/0286480 A1 * | 12/2005 | Akiyama | 370/338 |
| 2007/0002728 A1 * | 1/2007 | Fujii et al. | 370/210 |
| 2007/0026868 A1 * | 2/2007 | Schulz et al. | 455/454 |
| 2007/0058524 A1 * | 3/2007 | Modlin et al. | 370/208 |
| 2007/0081491 A1 * | 4/2007 | Kim et al. | 370/329 |
| 2007/0097867 A1 * | 5/2007 | Kneckt et al. | 370/236 |
| 2007/0147322 A1 * | 6/2007 | Agrawal et al. | 370/338 |
| 2007/0183370 A1 * | 8/2007 | Wallace et al. | 370/333 |
| 2007/0258419 A1 * | 11/2007 | Zhao et al. | 370/338 |
| 2007/0264936 A1 * | 11/2007 | Kim et al. | 455/45 |
| 2008/0070510 A1 * | 3/2008 | Doppler et al. | 455/69 |
| 2008/0101306 A1 * | 5/2008 | Bertrand et al. | 370/336 |
| 2008/0248805 A1 * | 10/2008 | Han et al. | 455/450 |
| 2009/0103558 A1 * | 4/2009 | Zangi et al. | 370/447 |
| 2009/0185600 A1 * | 7/2009 | Hethuin et al. | 375/133 |
| 2009/0279509 A1 * | 11/2009 | Reumerman et al. | 370/335 |

* cited by examiner

*Primary Examiner* — Ayaz Sheikh
*Assistant Examiner* — Peter Chau
(74) *Attorney, Agent, or Firm* — Locke Lord LLP

(57) ABSTRACT

Method, apparatus, and computer program product embodiments are disclosed to enable an access point in a wireless network to use Orthogonal Frequency-Division Multiple Access (OFDMA) reserve subcarriers of OFDM symbols for transmitting high priority voice data and video data to particular wireless devices, while the access point allocates the remaining available subcarriers for contention-based access by other wireless devices.

30 Claims, 8 Drawing Sheets

FIG. 4

| SUBCARRIER | | T1 | T2 | T3 | T4 | T5 | T6 | T7 | T8 |
|---|---|---|---|---|---|---|---|---|---|
| CONTENTION | 8 | SC81 | SC82 | SC83 | SC84 | SC85 | SC86 | SC87 | SC88 |
| CONTENTION | 7 | SC71 | SC72 | SC73 | SC74 | SC75 | SC76 | SC77 | SC78 |
| LR-VIDEO AC-2 | 6 | SC61 | SC62 | SC63 | SC64 | SC65 | SC66 | SC67 | SC68 |
| LR-VIDEO AC-2 | 5 | SC51 | SC52 | SC53 | SC54 | SC55 | SC56 | SC57 | SC58 |
| CONTENTION | 4 | SC41 | SC42 | SC43 | SC44 | SC45 | SC46 | SC47 | SC48 |
| CONTENTION | 3 | SC31 | SC32 | SC33 | SC34 | SC35 | SC36 | SC37 | SC38 |
| VOICE AC-3 | 2 | SC21 | SC22 | SC23 | SC24 | SC25 | SC26 | SC27 | SC28 |
| VOICE AC-3 | 1 | SC11 | SC12 | SC13 | SC14 | SC15 | SC16 | SC17 | SC18 |

SYMBOL TIME

CHANNEL ACCESS PROTOCOL FOR WIRELESS COMMUNICATION

FIELD

The embodiments disclosed relate to enabling an entity, such as, for example an access point in a wireless network according to one non-limiting example embodiment to reserve subcarriers of orthogonal frequency division multiplexing (OFDM) symbols for transmitting high priority data to particular nodes in the network, while allocating the remaining available subcarriers for contention-based access by other nodes in the network.

BACKGROUND

Modern society has quickly adopted, and become reliant upon, electronic devices, such as, for example handheld devices for wireless communication. For example, cellular telephones continue to proliferate in the global marketplace due to technological improvements in both the communication quality and device functionality. These wireless communication devices have become common for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate wireless communication over large geographic areas. These network technologies have commonly been divided by generations, starting in the late 1970s to early 1980s with first generation (1G) analog cellular telephones that provided baseline voice communication, to modern digital cellular telephones. Global System for Mobile Communications (GSM) is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a wireless communications device (WCD) to transmit and receive text messages of up to 160 characters, while providing data transfer to packet networks, Integrated Services Digital Network (ISDN) and Plain Old Telephone Service (POTS) users at 9.6 Kbps. The Multimedia Messaging Service (MMS), an enhanced messaging system allowing for the transmission of sound, graphics and video files in addition to simple text, has also become available in certain devices. Soon, emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced Data Rate (EDR) technology, which is also available, may enable maximum asymmetric data rates of 1448 Kbps for a 2 Mbps connection and 2178 Kbps for a 3 Mbps connection. In addition to Bluetooth™, other popular short-range wireless networks include for example IEEE 802.11x Wireless LAN, Wireless Universal Serial Bus (WUSB), Ultra Wideband (UWB), ZigBee (IEEE 802.15.4 and IEEE 802.15.4a), wherein each of these exemplary wireless mediums have features and advantages that make them appropriate for various applications.

As an example, IEEE 802.11a, 802.11g, and HiperLAN/2 wireless local area networks (WLANs) employ orthogonal frequency division multiplexing (OFDM) for the transmission of multiple sub-carriers in parallel to a receiving station or device (STA), enabling improved resistance to an interfering RF signal, since only those subcarriers having the same frequency as the interfering signal will be affected. OFDM divides the frequency spectrum into a number of equally spaced subcarriers, each of which carries a portion of a user's information. Each OFDM subcarrier is orthogonal with every other subcarrier, meaning the peak of one sub-carrier coincides with the null of an adjacent sub-carrier and they do not interfere with each other. User data may be modulated at the transmitting station or device onto the subcarriers by adjusting the subcarrier's phase, amplitude, or both. Either phase shift keying (PSK) or quadrature amplitude modulation (QAM) can be employed to modulate a binary one or zero onto the subcarrier. An OFDM system takes an input data stream and splits it into N parallel component streams, each at a rate 1/N of the original rate of the input data stream. Each component stream is then mapped onto a subcarrier at a unique frequency and combined together using the inverse fast Fourier transform (IFFT) to yield an OFDM symbol to be transmitted in the time-domain to a receiving station or device.

Carrier Sense Multiple Access/Collision Avoidance (CSMA-CA) is based on packet contention, and is the primary medium access method employed by IEEE 802.11 WLANs. It allows each transmitting station or device to contend for the shared channel by sensing whether the channel is in use, before attempting to transmit information to a receiving station or device. When a packet of information is to be sent, the transmitting device determines if the channel is clear, i.e., that no other device is transmitting at that moment. If the channel is clear, then the packet is sent. If the channel is not clear, the transmitting device waits for a random period of time and then determines again whether the channel is clear. If the channel is found to be clear on the second determination, the transmitting device transmits the packet. If the channel is not clear, then the process is repeated.

Each packet transmitted according to IEEE 802.11x WLAN protocols is typically in the form of a medium access control (MAC) frame consisting of a MAC header, a frame body, and a frame check sequence. The MAC header has thirty octets of overhead information including frame control, addressing for the transmitting and receiving devices, and sequence control information. The frame body following the header, contains the payload information, which may be management information, additional control information, or user data. The overhead represented by the MAC header is fixed for each packet, independent of the packet size. For large packets, the header represents only a few percent or less, but for small packets its size may be of the same order as the payload itself.

The contention based CSMA-CA channel access scheme is typically not efficient for aggregate system throughput in high-bandwidth systems, such as, for example Very High Throughput (VHT) WLAN systems. A large bandwidth is advantageous to support very high data-rate applications. However, there may be many devices in a Basic Service Set (BSS), each of which needs to contend for the shared channel to transmit relatively low-bandwidth, real-time traffic, such as, for example Voice Over Internet Protocol (VoIP) calls or real-time video. The frequent need to contend for channels to deliver high priority, time-critical data streams may cause significant inefficiency in spectrum usage, especially when short data packets must be transmitted with MAC headers as large as the frame body.

Real-time voice and video traffic are usually periodic in nature and a wireless Access Point (AP) has to typically deliver the streams within a short delay period to several non-AP wireless devices (STAs). Due to Quality of Service (QoS) constraints, real-time voice and video traffic can not be buffered for a long time, and hence the typical aggregation mechanisms in the IEEE 802.11n standard are not effective to reduce the number of channel contentions. When transmitting a Physical Layer Protocol Data Unit (PPDU) containing a payload of short packets (e.g., 200-1000 bytes), a large part of the PPDU time is taken by the PPDU preamble overhead (on the order of 20-48 us). Hence, frequent short packet transmissions can substantially reduce the effective throughput of the system.

SUMMARY

Method, apparatus, and computer program product embodiments are disclosed to enable an access point in a wireless network to use Orthogonal Frequency-Division Multiple Access (OFDMA) to reserve subcarriers of OFDM symbols for transmitting high priority voice data and video data to particular wireless devices, while the access point allocates the remaining available subcarriers for contention-based access by all wireless devices in the BSS.

Orthogonal Frequency-Division Multiple Access (OFDMA) subcarriers are allocated on top of existing Carrier Sense Multiple Access/Collision Avoidance (CSMA-CA) contention based subcarriers. The access point device simultaneously transmits data to several wireless devices in the downlink using a set of OFDMA subcarriers allocated to each of the devices. The subcarriers are flexibly allocated to devices for multiuser diversity and to provide fairness in applying Quality of Service (QoS).

An example embodiment enables reducing the frame overhead by minimizing the channel contentions and header overhead for a very high throughput WLAN system. The example embodiment includes reserving a first plurality of Orthogonal Frequency-Division Multiple Access (OFDMA) subcarriers to a group of wireless receiving devices, for delivering wireless messages with high access categories. The example embodiment allocates a second plurality of OFDMA subcarriers for contention based access by wireless receiving devices, for delivering wireless messages with other access categories than the high access categories.

An example embodiment of an access point includes a transceiver having a transmitter and receiver portions. The receiver is configured to receive from at least one wireless device a request for at least one Orthogonal Frequency-Division Multiple Access (OFDMA) subcarrier, the OFDMA subcarrier being a member of a group of OFDMA subcarriers occupying an available spectrum. The access point includes a processor CPU configured to reserve at least one allocated OFDMA subcarrier to the at least one wireless device in response to the request, based on allocation criteria, for exchanging wireless messages with high access categories. The allocation criteria can include traffic load and configuration, only high access categories for voice messages, only high access categories for low-rate video messages, various combinations of voice and video messages, channel quality information (CQI), Quality of Service (QoS) requirements, and subcarrier interference. The processor CPU is configured to allocate a remaining portion of the available spectrum to a plurality of OFDMA subcarriers not including the at least one allocated OFDMA subcarrier, for contention based access by wireless receiving devices, for exchanging wireless messages with other access categories than the high access categories. The transmitter portion of the transceiver is configured to transmit to the at least one wireless device a subcarrier reservation map designating the at least one allocated OFDMA subcarrier and the plurality of OFDMA subcarriers.

An example embodiment of a Wireless Device includes a transceiver that has a transmitter portion and a receiver portion. The transmitter is configured to transmit to a wireless access point a request for at least one Orthogonal Frequency-Division Multiple Access (OFDMA) subcarrier for delivering wireless messages with high access categories, the OFDMA subcarrier being a member of a group of OFDMA subcarriers occupying an available spectrum. The request is transmitted in an association or reassociation request frame. The receiver of the transceiver is configured to receive from the access point a subcarrier reservation map designating at least one allocated OFDMA subcarrier and a plurality of OFDMA subcarriers occupying a remaining portion of the available spectrum not including the at least one allocated OFDMA subcarrier, for contention based access to deliver wireless messages with other access categories than the high access categories. The subcarrier reservation map can be received in an association response or reassociation response frame, a beacon frame, or a probe response frame. The receiver of the transceiver is configured to selectively exchange traffic in the at least one allocated OFDMA subcarrier for wireless messages with the high access categories. The wireless device includes a processor CPU configured to selectively contend for at least one of the plurality of OFDMA subcarriers to exchange wireless messages with the other access categories than the high access categories.

Example embodiments can include the wireless messages having high access categories for voice messages. Example embodiments can include the wireless messages having high access categories for low-rate video messages.

Example embodiments can include the first plurality of OFDMA subcarriers delivering management and control wireless messages.

Example embodiments can include the group of wireless receiving devices requesting the reservation of the first plurality of OFDMA subcarriers. Example embodiments can include the subcarrier reservation being of subcarriers adjacent to each other. Example embodiments can include the subcarrier reservation being of subcarriers well separated from one another to avoid frequency correlation between subcarriers.

Example embodiments can include the subcarrier reservation being based on the channel quality information.

Example embodiments can include the subcarrier reservation being OFDMA subcarrier allocation on top of existing CSMA/CA contention based channel access.

Example embodiments can include the subcarrier reservation being performed by a wireless access point devices configured to simultaneously transmit data downlink to several wireless devices using the first plurality of OFDMA subcarriers allocated to group of wireless receiving devices.

Example embodiments can include the subcarrier reservation map being received dynamically for each physical layer protocol data unit (PPDU) inside the signaling field of its physical layer convergence procedure (PLCP) preamble.

DESCRIPTION OF THE FIGURES

FIG. 4 illustrates an example assignment of subcarriers to be used for delivery of AC-3 (voice) and AC-2 (low-rate video) traffic and shows the subcarriers in an example sequence of OFDMA symbols.

EXAMPLE EMBODIMENTS OF THE INVENTION

Orthogonal Frequency-Division Multiple Access (OFDMA) is a multi-user version of Orthogonal frequency-division multiplexing (OFDM) digital modulation employing multiple closely spaced sub-carriers, but OFDMA assigns subsets of the subcarriers to individual receivers, allowing simultaneous low data rate transmission to several receiving devices.

Figure 1:
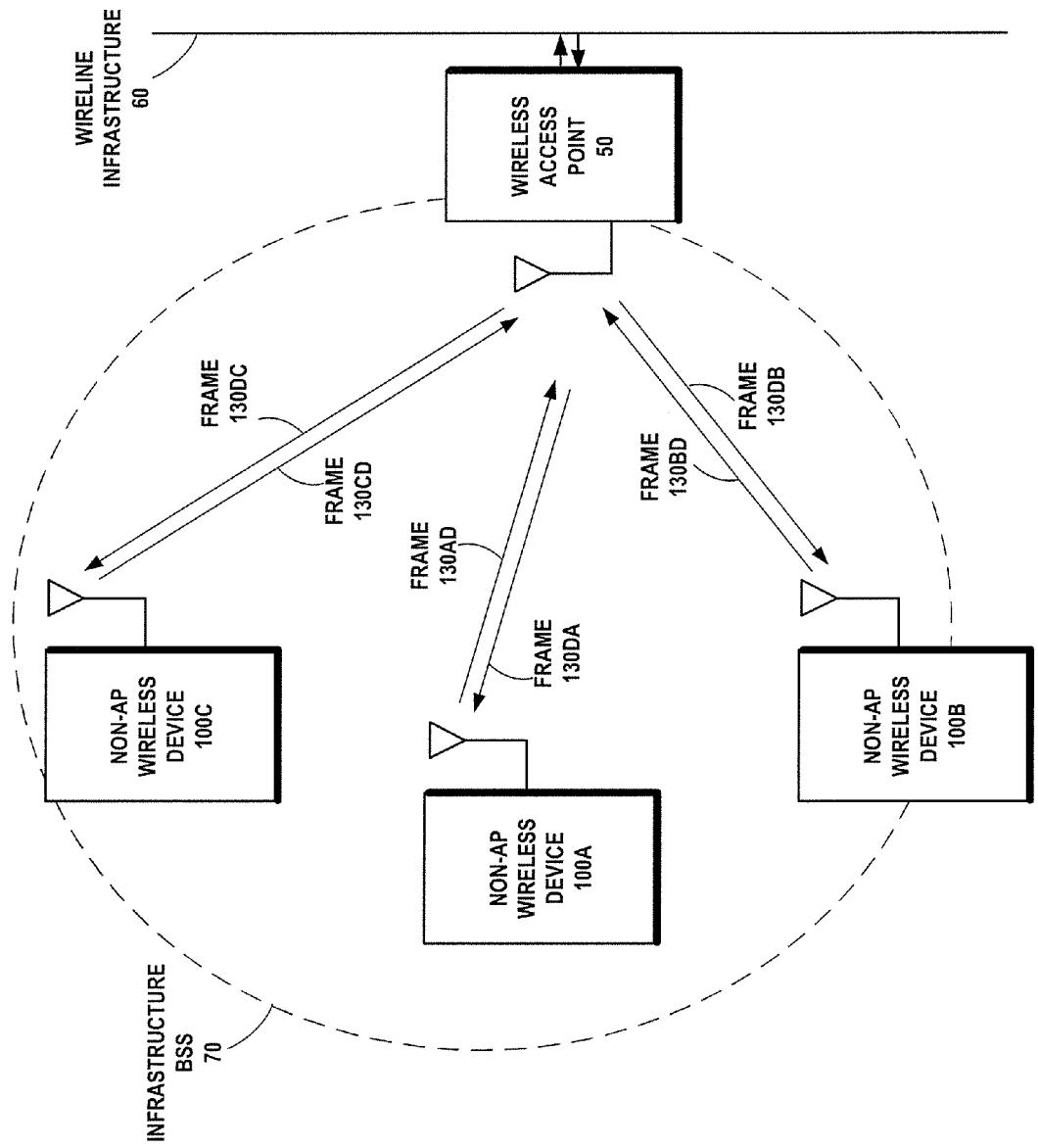
FIG. 1 is an example network diagram of an infrastructure BSS network with three non-AP wireless devices (STAs) and an access point (AP), which performs wireless-to-wired bridging from the STAs to a wired infrastructure network.

FIG. 1 is an example embodiment network diagram of an exemplary infrastructure BSS network 70, with three non-AP wireless devices (STAs) 100A, 100B, and 100C and an access point (AP) 50, which performs wireless-to-wired bridging from the STAs 100A, 100B, and 100C to a wired infrastructure network 60. The STAs 100A, 100B, and 100C may operate under the emerging new very high throughput (VHT) WLAN standard using a relatively large bandwidth. For example, VHT systems in 60 GHz may use a large bandwidth of up to 1 GHz. FIG. 1 shows the STA 100A and the AP 50 exchanging frames of data 130DA and 130AD in accordance with the VHT WLAN standard. In addition to the access point (AP) 50 performing the wireless-to-wired bridging from the non-AP wireless devices (STAs) 100B and 100C to the wired infrastructure network 60, the access point (AP) 50 can also relay communications between the non-AP wireless devices (STAs) 100A, 100B, and 100C in the infrastructure BSS 70.

Figure 2:
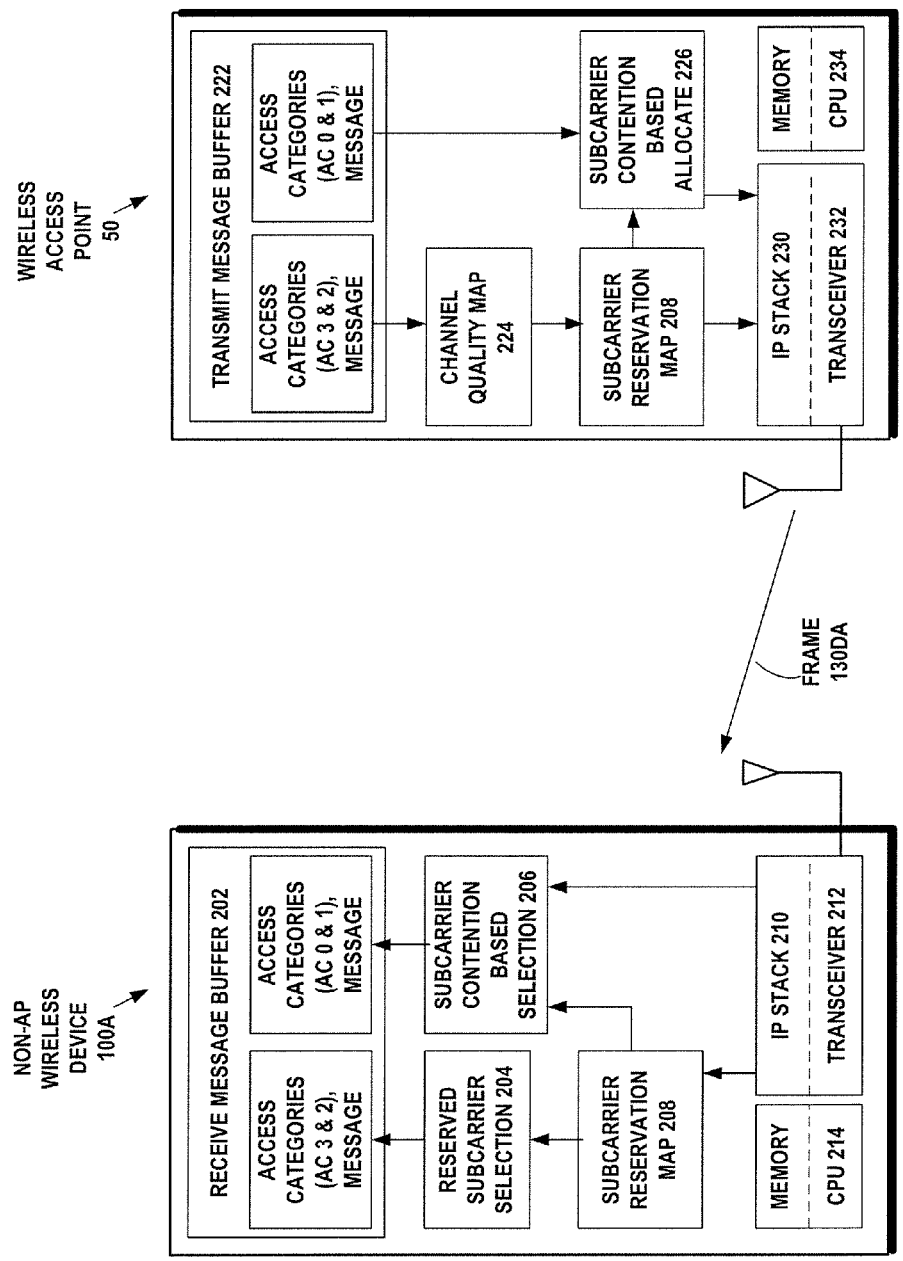
FIG. 2 illustrates a functional block diagram of an example embodiment of the non-AP wireless device and access point.
Figure 3:
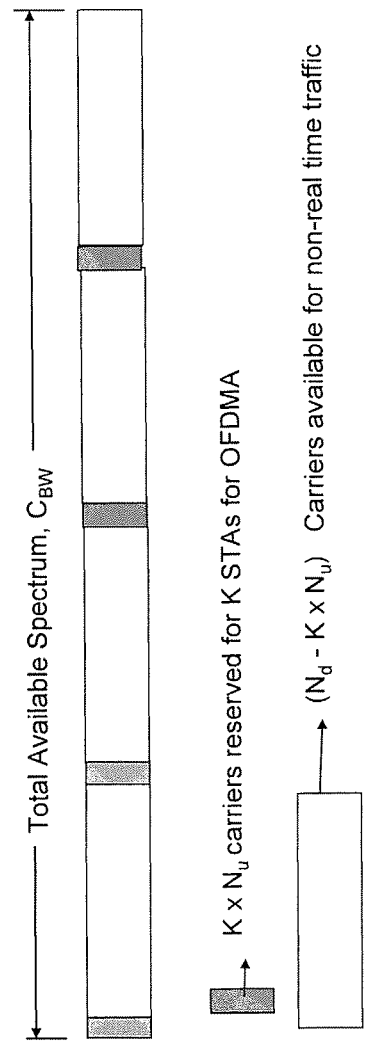
FIG. 3 illustrates an example allocation of subcarriers for OFDMA over K real-time devices and remaining subcarriers for non-real time traffic delivery.

FIG. 2 illustrates a functional block diagram of an example embodiment of the non-AP wireless device 100A and access point 50. The access point 50 compiles a subchannel reservation map 208 that allocates, according to at least one non-limiting example embodiment, some small part of bandwidth for devices having real-time traffic streams and allows a larger part of bandwidth to be shared based on channel contention by all devices in the BSS 70. A channel quality map 224 can be used to identify subcarrier channels having good quality, which may be allocated to the highest access category (AC) messages in the transmit message buffer 222, such as, for example time-critical voice messages with AC-3 or video messages with AC-2. Lower access category messages in the transmit message buffer 222, with AC-1 or AC-0 are allocated to contention based access and are assigned to subcarrier channels having a lower quality by the subcarrier contention based allocate module 226. The subchannel reservation map 208 may be transmitted by the AP 50 to all non-AP wireless devices 100A, 100B, 100C in the BSS 70 to enable them to select subcarriers allocated to them and subcarriers containing contention based messages. The IP stack 230 and transceiver 232 in the AP 50 transmit the various messages according to their allocation to OFDMA subcarriers. FIG. 3 illustrates an example allocation of OFDMA subcarriers for high access category messages to K users and for lower access category contention based messages.

The principle is to allocate a certain agreed number of subcarriers to different STAs 100A, 100B, 100C using OFDMA for delivering traffic of certain access categories (such as AC 3 and 2), on top of CSMA/CA contention based access for other access categories (e.g., AC 0 and 1) in the downlink. In this system, the Access Point (AP) 50 reserves a part of data subcarriers to all associated STAs 100A that have requested such reservation through association/reassociation signalling. These subcarriers will be used for delivery of AC-3 (voice) and/or AC-2 (low-rate video) traffic. These reserved subcarriers can also be used to deliver management and control frames. This is advantageous for VHT systems operating in 60 GHz as well as for below 6 GHz band.

The exemplary access point 50 in FIG. 2 includes a transceiver 232 having a transmitter and receiver portions. The receiver is configured to receive from at least one non-AP wireless device 100A a request for at least one Orthogonal Frequency-Division Multiple Access (OFDMA) subcarrier, the OFDMA subcarrier being a member of a group of OFDMA subcarriers occupying an available spectrum.

The exemplary access point 50 in FIG. 2 further includes a processor CPU 234 configured to reserve at least one allocated OFDMA subcarrier to the at least one non-AP wireless device 100A in response to the request, based on allocation criteria, for exchanging wireless messages with high access categories. The allocation criteria can include traffic load and configuration, only high access categories for voice messages, only high access categories for low-rate video messages, various combinations of voice and video messages, channel quality information (CQI), Quality of Service (QoS) requirements, and subcarrier interference.

The processor CPU 234 is configured to allocate a remaining portion of the available spectrum to a plurality of OFDMA subcarriers not including the at least one allocated OFDMA subcarrier, for contention based access by wireless receiving devices 100A, 100B, and 100C, for exchanging wireless messages with other access categories than the high access categories.

The transmitter portion of the transceiver 232 is configured to transmit to the at least one non-AP wireless device 100A a subcarrier reservation map 208 designating the at least one allocated OFDMA subcarrier and the plurality of OFDMA subcarriers.

Figure 5A:
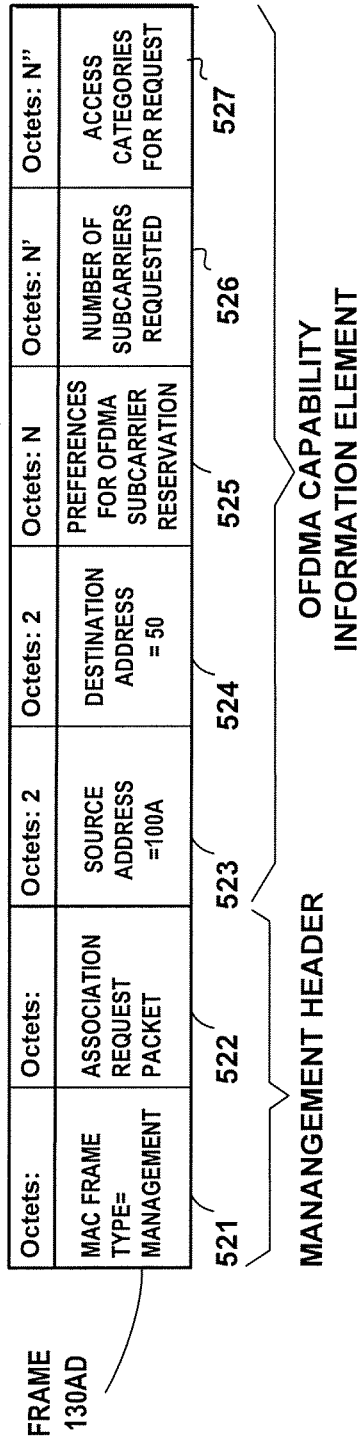
FIG. 5A illustrates an example MAC management frame sent by a non-AP wireless device to the access point with an OFDMA capability information element requesting preferences for OFDMA subcarrier reservation.

The exemplary non-AP wireless device 100A in FIG. 2 includes a transceiver 212 that has a transmitter portion and a receiver portion connected to the IP stack 210. The transmitter is configured to transmit to a wireless access point 50 a request for at least one Orthogonal Frequency-Division Multiple Access (OFDMA) subcarrier for delivering wireless messages with high access categories, the OFDMA subcarrier being a member of a group of OFDMA subcarriers occupying an available spectrum. The request is transmitted in an association request or reassociation request frame. FIG. 5A illustrates an example MAC management frame 130AD sent by the non-AP wireless device 100A to the access point 50 with an OFDMA capability information element requesting preferences for OFDMA subcarrier reservation. While sending an association or reassociation request to the AP 50, an STA 100A may indicate its preference for OFDMA subcarrier reservation for real-time traffic. An OFDMA capability information element is used for this purpose, which will have information of the number of subcarriers and the allowed access categories in the reserved carriers. The AP 50 will signal the grant of such request in the (Re)Association response.

Figure 5B:
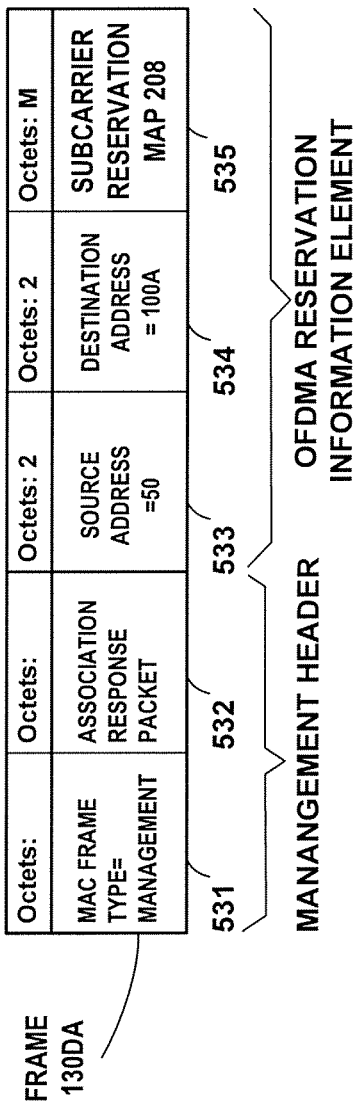
FIG. 5B illustrates an example MAC management frame sent by the access point to the non-AP wireless device with an OFDMA reservation information element granting an OFDMA subcarrier reservation.

A receiver portion of the transceiver 212 is configured to receive from the access point 50 a subcarrier reservation map 208 designating at least one allocated OFDMA subcarrier and a plurality of OFDMA subcarriers occupying a remaining portion of the available spectrum not including the at least one allocated OFDMA subcarrier, for contention based access to deliver wireless messages with other access categories than the high access categories. The subcarrier reservation map 208 can be received in an association response or reassociation response frame, a beacon frame, or a probe response frame. FIG. 5B illustrates an example MAC management frame 130DA sent by the access point 50 to the non-AP wireless device 100A with an OFDMA reservation information element granting an OFDMA subcarrier reservation. Additionally, the Access Point (AP) 50 can advertise its current setting on the use of subcarriers through a beacon frame or a probe response frame. An information element for OFDMA reservation can be utilized for this purpose.

The receiver portion of the transceiver 212 is further configured to selectively exchange traffic in the at least one allocated OFDMA subcarrier for wireless messages with the high access categories using the reserved subcarrier selection module 204 and store the messages in the receive message buffer 202.

The exemplary non-AP wireless device 100A in FIG. 2 includes a processor CPU 214 configured to selectively contend for at least one of the plurality of OFDMA subcarriers to exchange wireless messages with the other access categories than the high access categories. The subcarrier contention based selection 206 selects the received, contention based subcarriers and stores them in the receive message buffer 202.

The following is an example embodiment of a subcarrier allocation to multiple receivers for prioritized traffic in downlink. Example embodiments allocate certain agreed number of subcarriers to different STAs using OFDMA for delivering real-time traffic of certain access categories (such as AC 3 and 2), on top of CSMA/CA contention based access in downlink of WLAN system. The rest of subcarriers can be used for delivering traffic of other access categories (e.g., AC 0 and 1) destined to any device based on the traffic condition of the AP. In example embodiments, the AP reserves a part of data subcarriers to all associated STAs which have requested such reservation through association/reassociation signaling. These subcarriers will be used for delivery of real-time traffic (AC-3 voice and/or AC-2 video-streaming content). These reserved subcarriers may possibly be used also to deliver certain management and control frames. The main advantage is to allow delivery of real-time traffic to multiple users in a timely manner as well as utilize the channel resource more efficiently. This example embodiment is useful for VHT systems operating in 60 GHz as well as for below 6 GHz band.

FIG. 3 illustrates an example allocation of subcarriers for OFDMA over K real-time devices and remaining subcarriers for non-real time traffic delivery. The subcarrier reservation can be done by using a group of subcarriers adjacent to each other or from well separated subcarrier groups as shown. To avoid frequency correlation between subcarriers, well separated subcarrier groups is preferred. A minimum chunk of subcarriers that may be allocated to one user is termed as a subchannel. Additionally, the subcarriers may be allocated based on the channel quality information (CQI) assessment from AP when channel feedback information is available from the devices. By allocating a group of subcarriers to users using optimal channel conditions can improve the link performance to devices. However, the AP needs to track the channel estimates to different devices dynamically from feedback information. Whenever AP has such information, it will allocate subchannels with best CQI to the device so that the delivery of the prioritized traffic will be error free in most of the cases.

As an example, to illustrate the basic advantage of the example embodiment, consider the number of fast Fourier transform ($N_{FFT}$)=2560 carriers in a system with channel bandwidth (CBW)=400 MHz with a subcarrier bandwidth of $f_{BW}$=0.1563 MHz, and a OFDM symbol duration of 6.8 us with 400 ns guard interval. Consider the number of data carriers to be $N_{DATA}$=2176. In such a high-bandwidth system, if the AP tries to deliver small voice over internet (VoIP) packets to one user, the data part of Physical Layer Protocol Data Unit (PPDU) can be contained in 1 OFDM symbol alone, with many bits of padding required to modulate all subcarriers. For example, on using a code rate ¾, 2 spatial streams and 64 QAM, the PHY data rate of 2880 Mbps can be achieved. However, for sending 1 VoIP packet of 156 B size (120 B payload+36 B MAC overhead), the 1664 coded bits can already be modulated by 140 subcarriers only. The rest of the subcarriers will be modulated by padded bits and underutilized. Another cost associated with such small PPDU delivery is a relatively large PHY overhead in the order of 20-48 microsec and overhead for channel contention and collisions when using enhanced distributed channel access (EDCA) access. The typical aggregation mechanisms from 802.11n system may not be useful due to periodic arrival of such traffic and delay constraints disallowing waiting to aggregate packets before delivery. Hence, the channel utilization can be highly inefficient, which can be avoided, if we rather use larger PPDU size for use towards other users for efficient utilization of the resources.

Now, assume there are for example 10 devices (e.g., STA 1 to 10) active which have requested OFDMA subcarrier reservation for real-time traffic, and allocate 1 subchannel consisting of 32 subcarriers to these devices, we need to reserve about 15% of the available spectrum for real-time traffic to these users. When using code rate ¾, 2 spatial streams and 64 QAM, 1 such subchannel can convey 42.35 Mbps PHY data rate out of 2880 Mbps total. To deliver a short VoIP packet using 1 subchannel would now require 5 OFDM symbols. However, many other devices can simultaneously transmit such packets without having to wait for other channel contention opportunities. The rest of the subchannels still can carry non-real time data to any device (say STA # x, which may also be any STA 1-10 as well) based on internal priority among devices with data in AP's queues for lower access categories. Another use is to include short management and control frames such as ACK/BlockAck/BlockAckRequest frames to several devices using these reserved subchannels. Hence, the proposed scheme can provide delivery without interruption for real-time traffic or certain management and control frames and avoids many channel contentions that reduces overhead due to contention and collision in the BSS.

The AP prepares a PPDU by using real-time payload from STA 1-10 to modulate their respective subcarriers assigned for them, and non-real time data from STA# x in rest of the subcarriers. While receiving the PPDU from air, the device # x demodulates all subcarriers except the ones reserved for other devices. Other participating devices with subcarrier reservation only demodulate the subcarriers reserved for them to receive any traffic in the reserved subcarriers. In traditional IEEE 802.11 WLAN systems, all STAs will be using the frame in air only for the purpose of updating their Net Allocation Vector (NAV), whereas, in the example embodiment, they can simultaneously receive their traffic as well.

The above illustration only demonstrates a typical use of the example embodiment. Many possible implementation choices are described in the following.

Example Implementations:

Two example methods are described to implement the example embodiment:

Example Method A: Downlink delivery of real-time traffic by OFDMA reservation and non-real time traffic in unused subcarriers:

This example method can be chosen when a relatively smaller number of devices have real-time traffic (e.g. AC 3 or AC2) and the downlink delivery can be served by reserving a chunk of subcarriers each to each of these users. A predefined minimum number of subcarriers are assigned to one such user (e.g. 16 or 32 data subcarriers in one subchannel). All subcarriers are divided in terms of subchannels with unique subchannel-index assigned to them.

Example Method B—OFDMA reservation by dividing all subcarriers to different users for real-time traffic delivery:

When there are many devices having real-time traffic flows in the BSS requiring significant resources, then at the time of contention for such real-time traffic (AC3 or AC2), AP will use a specific chunk of subcarriers (subchannels) to different users. The assignment of subchannels may be done as per the resource requirement of different devices, which would require signaling of subchannel assignment to devices for each PPDU basis. The data multiplexing in this case is done as in full OFDMA for sending real-time traffic using EDCA contention. The example is a form of multi-receiver aggregation, in which the multiplexing is done in frequency domain.

To use the above 2 methods of OFDMA usage on top of CSMA/CA channel access from the AP, VHT system needs to support different VHT PPDU formats. As an example, following 3 types of PPDU formats can be specified:

1. VHT-PPDU Format 0—non-OFDMA type PPDU
2. VHT-PPDU Format 1—partial OFDMA used for real-time traffic and rest of subchannels for non-real time traffic
3. VHT-PPDU Format 2—with all subchannels used by OFDMA for real-time traffic Other implementation considerations:

1. Devices may request the OFDMA type allocation for any access categories based on their need, however, the AP will signal and utilize the OFDMA to deliver the traffic of access categories based on its traffic load and configuration. It may only allow reservation for AC 3 or both AC-2 and AC 3 traffic or any other combination, with any amount of subchannels to different devices. In one example implementation, all traffic may be delivered by OFDMA. Based on the traffic conditions, it may use PPDU format for method A or Method B in different times.

2. The AP may choose to send reverse direction grant to any of the devices with subcarrier reservation within its TXOP. In this case, the device may use the TXOP acquired by AP for uplink transmission.

3. The concept of OFDMA overlay can also be used during controlled access phase (CAP) of Hybrid Coordination Function (HCF) Controlled Channel Access (HCCA) for contention free delivery to multiple receivers using VHT-PPDU format 2. By combining HCCA with OFDMA with a group of subcarriers allocated to different users will have the added benefit of PHY overhead reduction due to multiple channel access required in traditional CAP of HCCA.

4. Power save devices may signal their transition to the doze state to AP by setting the necessary frame exchange sequence, after which, the AP may not use the subcarriers reserved for the devices and start buffering the traffic. One possibility is to use a pool of subcarriers for power save devices and only use when needed. Another possible implementation for power save devices is to set a predetermined Delivery-ON and Delivery-OFF durations, by which, the AP will deliver the traffic in reserved subcarriers only during the Delivery-ON period.

5. The OFDMA subcarrier reservation can also be extended to be used during a power save multi-poll (PSMP) sequence to power save PSMP capable devices, in which case, instead of allocating the individual downlink transmission time (DTT) time to multiple receivers, AP can allocate subcarriers during a aggregate DTT period to a group of participating devices based on the buffered traffic and deliver the aggregated data packets simultaneously to those devices. While the transmission is for a group of devices, other devices can sleep during the period they do not expect to receive the traffic. The concept can also be used in uplink Transmission Time (UTT) for uplink, if the preamble of the PPDU can be modified to include training symbols from multiple devices.

Example Signaling of the OFDMA Subcarrier Reservation:

To support various methods of OFDMA overlay, two example signaling methods are described:

1. Signaling of OFDMA subcarrier reservation during Association/Reassociation and Beacon/Probe Response Frames:

While sending association or reassociation request to AP, an STA may indicate its capability/preference for OFDMA subcarrier reservation for real-time traffic. An OFDMA capability information element is used for this purpose, which will have information of number of subchannels or subcarriers, and allowed traffic access categories in the reserved carriers. The AP will signal the grant of such request in the (Re) Association response.

The AP will advertise its current setting on the use of subcarriers through beacon and probe response frame. An information element for OFDMA reservation can be utilized for this purpose. This method uses fixed subchannel allocation decided by AP for PPDU format of type A: partial OFDMA within a PPDU 2. Signaling of OFDMA subcarrier reservation for each PPDU using VHT-SIG in physical layer convergence procedure (PLCP) preamble:

This signaling is needed when using OFDMA subchannel assignment is done dynamically based on traffic conditions for real-time traffic (AC3/AC2) to different devices. The AP will use TXOP for AC3 or AC2 traffic, and multiplex for different users by assigning subchannels.

FIG. 4 illustrates an example assignment of subcarriers to be used for delivery of AC-3 (voice) and AC-2 (low-rate video) traffic and shows the subcarriers in an example sequence of OFDMA symbols. Eight OFDMA symbols are shown transmitted in a sequence at times T1 to T8. Each OFDMA symbol is composed of eight orthogonal subcarriers equally spaced at eight levels distinguished by a combination of frequency, phase, and amplitude so that the peak of one sub-carrier coincides with the null of an adjacent sub-carrier. Each subcarrier carries a modulated user message. The nomenclature in FIG. 4 for the subcarriers is "SCnm", where "n" is the frequency/phase/amplitude level of the subcarrier and "m" is the symbol time "Tm". User data is modulated at the transmitting device onto the subcarriers by adjusting the subcarrier's phase, amplitude, or both, using either phase shift keying (PSK) or quadrature amplitude modulation (QAM) to modulate a binary one or zero onto the subcarrier. In this example, the access point 50 allocates two subcarriers 1 and 2 to voice AC-3 over the symbol times T1 to T8. The access point 50 allocates two subcarriers 5 and 6 to low-rate video AC-2 over the symbol times T1 to T8. The access point 50 allocates four subcarriers 3, 4, 7, and 8 to be available for contention access over the symbol times T1 to T8. Thus, the access point 50 allocates a number of subcarriers to different STAs 100A, 100B, 100C using OFDMA for delivering traffic of certain access categories (such as AC 3 and 2), on top of CSMA/CA contention based access for other access categories (e.g., AC 0 and 1) in the downlink. In this system, the Access Point (AP) 50 reserves a part of data subcarriers to all associated STAs 100A that have requested such reservation through association/reassociation signalling. These subcarriers will be used for delivery of AC-3 (voice) and/or AC-2 (low-rate video) traffic.

Devices 100A, 100B, 100C may request the OFDMA type allocation for any access categories based on their need, however, the Access Point (AP) 50 will signal and utilize the OFDMA to deliver the traffic of access categories based on its traffic load and configuration. It may only allow reservation for AC 3 or both AC-2 and AC 3 traffic or any other combination. In one possible implementation, all traffic may be delivered by OFDMA.

In example embodiments, the Access Point (AP) 50 may choose to send reverse direction grant to any of the devices with subcarrier reservation within its Transmission Opportunity (TXOP). In this case, the device 100A, 100B, 100C may use the TXOP acquired by Access Point (AP) 50 for uplink transmission.

In example embodiments, the principle of OFDMA overlay can be easily introduced during controlled access phase (CAP) of the Hybrid Coordination Function (HCF) or the contention free period (CFP) to simultaneously transmit to multiple devices with real-time traffic. By combining HCF Controlled Channel Access (HCCA) with OFDMA, a group of subcarriers allocated to different users will have the added benefit of physical layer (PHY) overhead reduction due to multiple channel access required in traditional CAP of HCCA.

In example embodiments, the power save devices may signal their transition to the sleep state to the Access Point (AP) 50 by setting the necessary frame exchange sequence, after which, the AP 50 may not use the subcarriers reserved for the devices and start buffering the traffic. One possibility is to use a pool of subcarriers for power save devices and only use subcarriers from the pool when needed. Another example implementation for power save devices is to set a predetermined Delivery-ON and Delivery-OFF durations, by which the AP 50 will deliver the traffic in reserved subcarriers only during the Delivery-ON period.

In example embodiments, the OFDMA subcarrier reservation can also be extended to be used during a power save multi-poll (PSMP) sequence to power save PSMP-capable devices, in which case, instead of allocating the individual downlink transmission time (DTT) to multiple receivers, Access Point (AP) 50 can allocate subcarriers during a aggregate DTT period to a group of participating devices based on the buffered traffic and deliver the aggregated data packets simultaneously to those devices. While the transmission is for a group of devices, other devices can sleep during the period they do not expect to receive the traffic. The concept can also be used in uplink Transmission Time (UTT), for uplink, if the preamble of the Physical Layer Protocol Data Unit (PPDU) can be modified to include training symbols from multiple devices.

In this manner, the system avoids inefficient use of channel access for delivering real-time traffic, which has stringent delay requirements, but relatively low bandwidth requirement. An overlay of OFDMA channel access for downlink is superimposed on top of the CSMA/CA based WLAN system. Another use of the OFDMA overlay is when interference sensing is used in the shared band, in which, a part of the spectrum is occupied by legacy WLAN BSS or by other wireless technologies such as WiMax overlapping with the WLAN spectrum band.

In other example embodiments, dynamic subcarrier allocation may be performed in situations when the wideband WLAN spectrum overlaps with legacy WLAN channels or other wireless technologies such as Bluetooth, or 802.15.3C PAN transmissions. An interference sensing mechanism can be used in the very high throughput (VHT) devices that allow the use of subcarriers outside the interference region to be used by VHT devices more effectively. This example embodiment is useful for VHT systems especially when the deployment is in licensed band.

Figure 6:
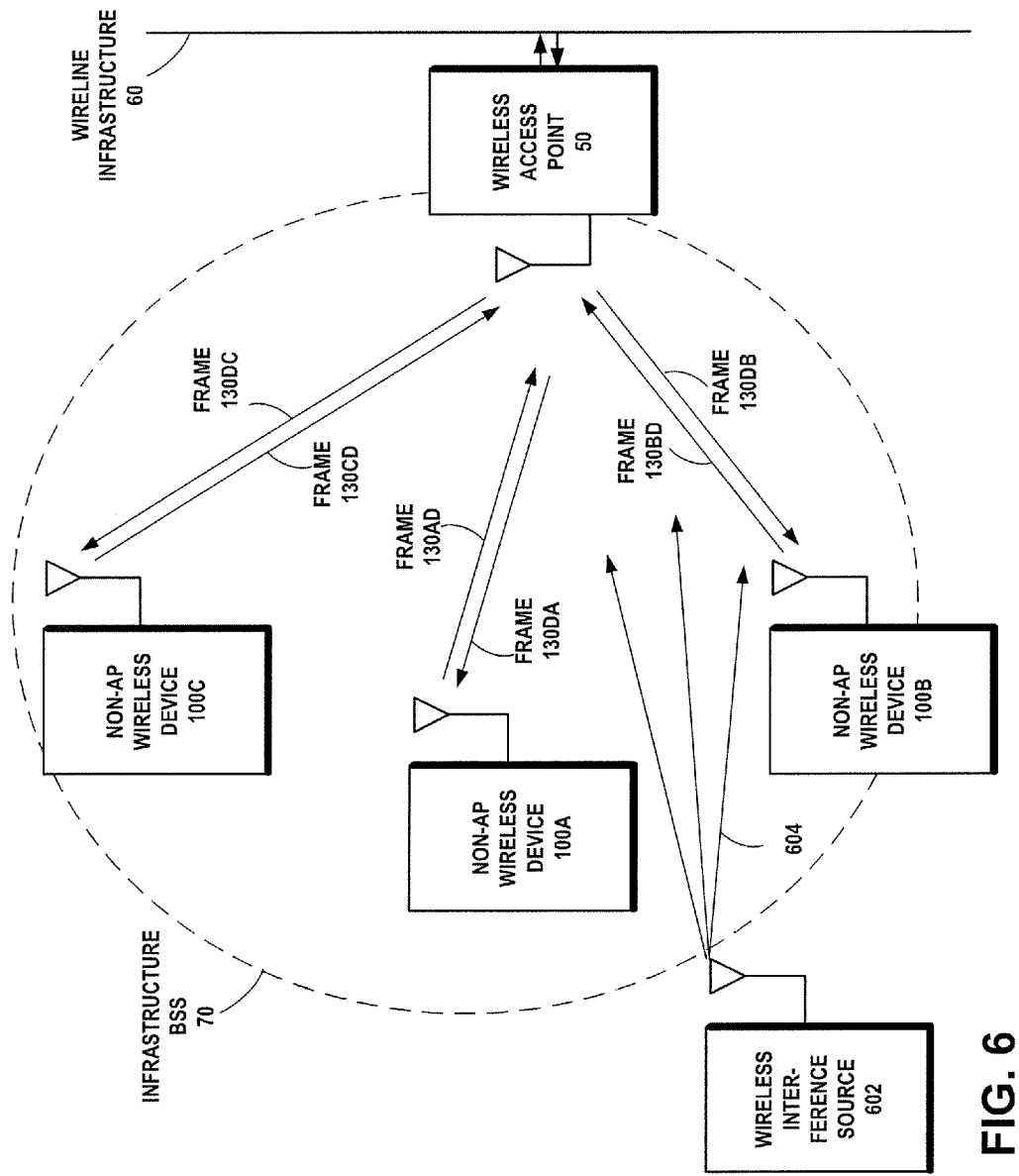
FIG. 6 is an example network diagram of the infrastructure BSS network of FIG. 1, with a wireless interference source radiating into the BSS network.

FIG. 6 is an example network diagram of the infrastructure BSS network of FIG. 1, with a wireless interference source 602 radiating into the BSS network 70.

Figure 7:
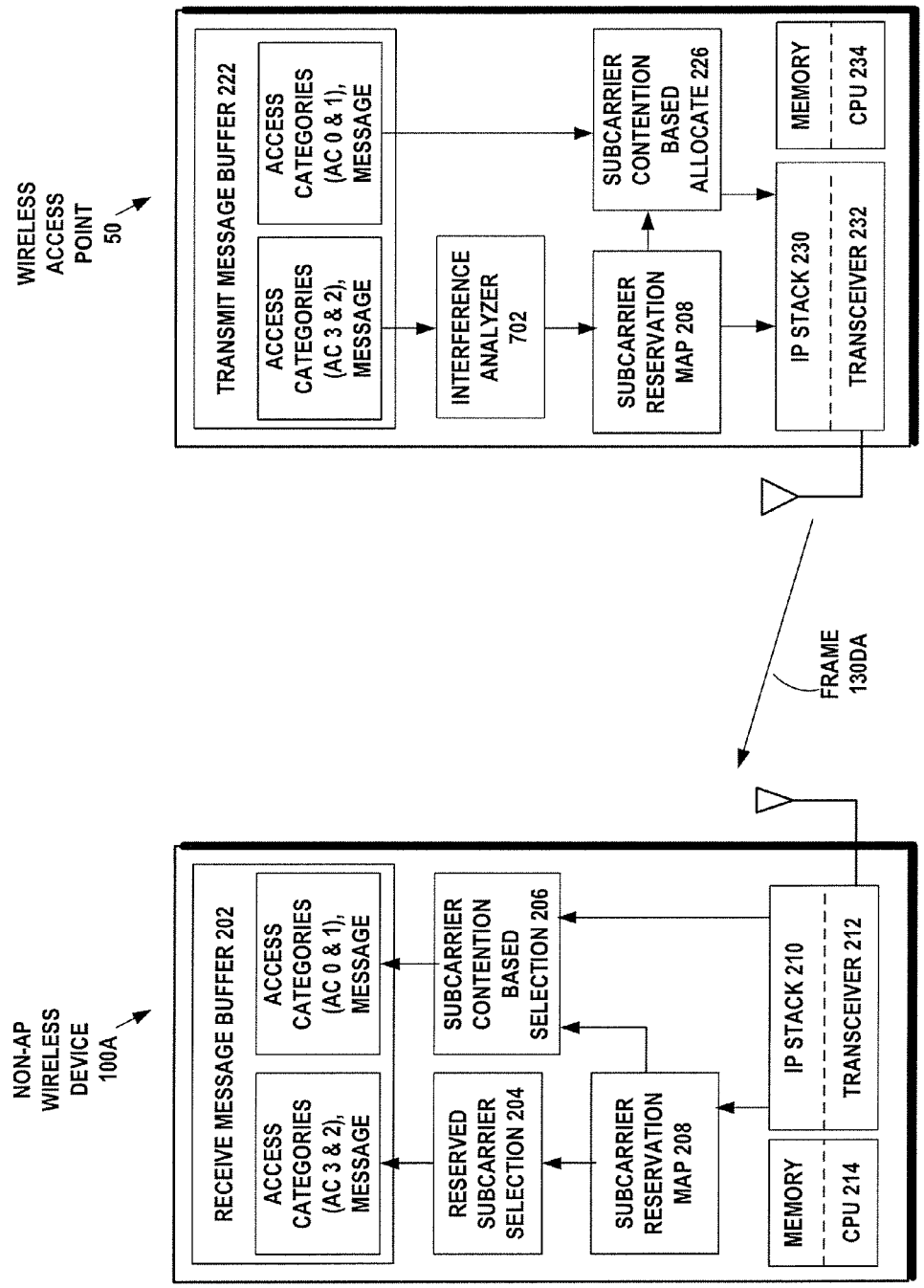
FIG. 7 illustrates a functional block diagram of an example embodiment of the non-AP wireless device and access point, with an interference analyzer used in allocating subcarrier reservations based on channel interference.

FIG. 7 illustrates a functional block diagram of an example embodiment of the non-AP wireless device 100A and access point 50, with an interference analyzer 702 used in allocating subcarrier reservations based on channel interference. This allows the use of interference sensing to prevent in-band interference from legacy devices in both the downlink and uplink. The AP 50 or STA 100A in a BSS 70 use the interference sensing mechanism in a group of subcarriers. Based on the estimated interference, the devices 100A or AP 50 will signal the index of a group of subcarriers in which interference is above certain threshold. These sets of subcarriers are not used by the devices 100A or AP 50 for any data or pilot transmission. Using the dynamic allocation of subcarriers for transmission, the interference free spectrum can be utilized more effectively by dynamically avoiding the interference region.

Figure 8:
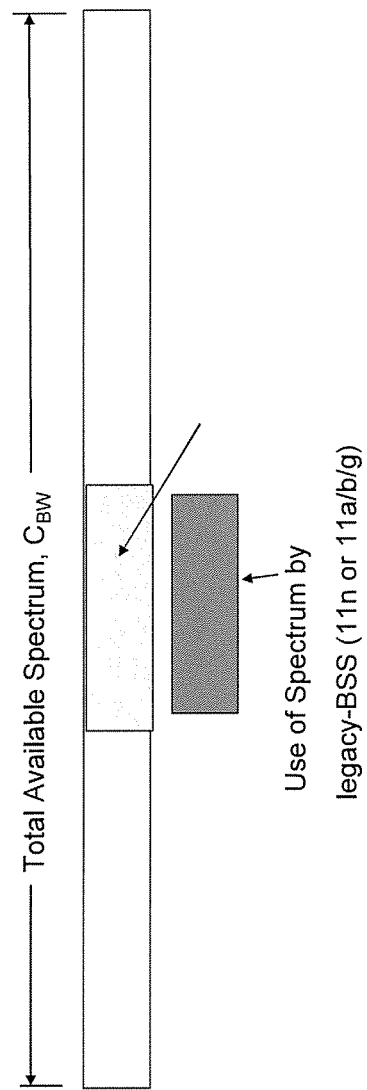
FIG. 8 illustrates an example allocation of subcarriers outside of the interference region.

FIG. 8 illustrates an example allocation of subcarriers outside of the interference region.

In example embodiments, the interference sensing can be implemented by using a number of techniques, which can use the energy detection or Clear Channel Assessment (CCA). The sensing is done in a group of adjacent subcarriers in a periodic interval and spans the whole spectrum of interest. The Access Point (AP) 50 or STA 100A may exchange such sensing information to exclude interference-rich group of subcarriers from their use. The interference may be temporary or appear for long time. The change in interference sensing may be exchanged by the devices in the BSS 70.

In example embodiments, the Access Point (AP) 50 broadcasts the indexes of a group of subcarriers under interference during a beacon or probe request, which prohibits using those interference-affected carriers for data and pilot modulations. However, the rest of the carriers can be used in downlink or uplink as usual.

In example embodiments, the interference may be in a portion of 20 or 40 MHz band from a legacy 802.11a/b/g/n BSS collocated in the region. The VHT-Access Point (AP) 50 or devices 100A, 100B, 100C may need to utilize a special mixed mode preamble to support coexistence between the legacy BSS and VHT BSS 70 overlapping a part of such spectrum.

In example embodiments, the principle can be utilized for simplified multi-radio coexistence between WLAN and other radio technologies such as WiMax/802.15.3C in which the interference information can be shared across multiple radio technologies to avoid interference.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:

reserving a first plurality of Orthogonal Frequency-Division Multiple Access (OFDMA) subcarriers to a group of wireless receiving devices, for delivering wireless messages comprising real-time traffic streams, with high access categories, the first plurality of OFDMA subcarriers being a portion of a group of OFDMA subcarriers occupying an available spectrum;

allocating a second plurality of OFDMA subcarriers for contention based access by wireless receiving devices, for delivering wireless messages with other access categories than said high access categories, the second plurality of OFDMA subcarriers being a remaining portion of the group of OFDMA subcarriers occupying the available spectrum not including the first plurality of OFDMA subcarriers; and exchanging at least one OFDMA symbol including at least one of said reserved subcarriers of the first plurality of OFMDA subcarriers and including said subcarriers of the second plurality of OFMDA subcarriers for contention based access.

2. The method of claim 1, wherein said wireless messages with high access categories include at least one of voice messages and low-rate video messages.

3. The method of claim 1, wherein said first plurality of OFDMA subcarriers deliver management and control information messages.

4. The method of claim 1, wherein subcarrier reservation is based on a channel quality information.

5. The method of claim 1, wherein subcarrier reservation is OFDMA subcarrier allocation on top of existing carrier sense multiple access/collision avoidance contention based channel access.

6. A method, comprising:

receiving from at least one wireless device a request for at least one Orthogonal Frequency-Division Multiple Access (OFDMA) subcarrier, the at least one OFDMA subcarrier being a member of a group of OFDMA subcarriers occupying an available spectrum;

reserving at least one allocated OFDMA subcarrier to said at least one wireless device in response to said request, based on allocation criteria, for exchanging wireless messages comprising real-time traffic streams, with high access categories;

allocating a remaining portion of said available spectrum to a plurality of OFDMA subcarriers not including said at least one allocated OFDMA subcarrier, for contention based access by wireless receiving devices, for exchanging wireless messages with other access categories than said high access categories;

transmitting to the at least one wireless device a subcarrier reservation map designating said at least one allocated OFDMA subcarrier and said plurality of OFDMA subcarriers; and transmitting at least one OFDMA symbol including said at least one allocated OFDMA subcarrier and at least one of said plurality of OFDMA subcarriers for contention based access.

7. The method of claim 6, wherein said allocation criteria include at least one of traffic load and configuration, high access categories for voice messages, high access categories for low-rate video messages, channel quality information (CQI), Quality of Service (QoS) requirements and subcarrier interference.

8. The method of claim 6, wherein said request is received in an association request or reassociation request frame.

9. The method of claim 6, wherein said subcarrier reservation map is transmitted in at least one of an association response or reassociation response frame, a beacon frame, and a probe response frame.

10. The method of claim 6, wherein said subcarrier reservation map is transmitted for each physical layer protocol data unit (PPDU) inside signaling field of its physical layer convergence procedure (PLCP) preamble.

11. A method, comprising:

transmitting to a wireless access point a request for at least one Orthogonal Frequency-Division Multiple Access (OFDMA) subcarrier for delivering wireless messages comprising real-time traffic streams, with high access categories, the at least one OFDMA subcarrier being a member of a group of OFDMA subcarriers occupying an available spectrum;

receiving from said access point a subcarrier reservation map designating at least one allocated OFDMA subcarrier for exchanging wireless messages comprising real-time traffic streams, with high access categories, and a plurality of OFDMA subcarriers occupying a remaining portion of said available spectrum not including said at least one allocated OFDMA subcarrier, for contention based access to deliver wireless messages with other access categories than said high access categories; and receiving at least one OFDMA symbol including said at least one allocated OFDMA subcarrier and at least one of said plurality of OFDMA subcarriers for contention based access.

12. The method of claim 11, wherein said high access categories include at least one of voice messages and low-rate video messages.

13. The method of claim 11, wherein said request is transmitted in an association request or reassociation request frame.

14. The method of claim 11, wherein said subcarrier reservation map is received in at least one of an association response or reassociation response frame, a beacon frame and a probe response frame.

15. The method of claim 11, wherein said subcarrier reservation map is received for each physical layer protocol data unit (PPDU) inside signaling field of its physical layer convergence procedure (PLCP) preamble.

16. A device, comprising:
a receiver configured to receive from at least one wireless device a request for at least one Orthogonal Frequency-Division Multiple Access (OFDMA) subcarrier, the at least one OFDMA subcarrier being a member of a group of OFDMA subcarriers occupying an available spectrum;
a processor configured to reserve at least one allocated OFDMA subcarrier to said at least one wireless device in response to said request, based on allocation criteria, for exchanging wireless messages comprising real-time traffic streams, with high access categories;
said processor configured to allocate a remaining portion of said available spectrum to a plurality of OFDMA subcarriers not including said at least one allocated OFDMA subcarrier, for contention based access by wireless receiving devices, for exchanging wireless messages with other access categories than said high access categories;
a transmitter configured to transmit to the at least one wireless device a subcarrier reservation map designating said at least one allocated OFDMA subcarrier and said plurality of OFDMA subcarriers; and
said transmitter further configured to transmit at least one OFDMA symbol including said at least one allocated OFDMA subcarrier and at least one of said plurality of OFDMA subcarriers for contention based access.

17. The device of claim 16, wherein said allocation criteria include at least one of traffic load and configuration, high access categories for voice messages, high access categories for low-rate video messages, channel quality information (CQI), Quality of Service (QoS) requirements and subcarrier interference.

18. The device of claim 16, wherein said request is received in an association request or reassociation request frame.

19. The device of claim 16, wherein said subcarrier reservation map is transmitted in at least one of an association response or reassociation response frame, a beacon frame, and a probe response frame.

20. The device of claim 16, wherein said subcarrier reservation map is transmitted for each physical layer protocol data unit (PPDU) inside signaling field of its physical layer convergence procedure (PLCP) preamble.

21. A device, comprising:
a transmitter configured to transmit to a wireless access point a request for at least one Orthogonal Frequency-Division Multiple Access (OFDMA) subcarrier for delivering wireless messages comprising real-time traffic streams, with high access categories, the at least one OFDMA subcarrier being a member of a group of OFDMA subcarriers occupying an available spectrum;
a receiver configured to receive from said wireless access point a subcarrier reservation map designating at least one allocated OFDMA subcarrier for exchanging wireless messages comprising real-time traffic streams, with high access categories, and a plurality of OFDMA subcarriers occupying a remaining portion of said available spectrum not including said at least one allocated OFDMA subcarrier, for contention based access to deliver wireless messages with other access categories than said high access categories; and
said receiver further configured to receive at least one OFDMA symbol including said at least one allocated OFDMA subcarrier and at least one of said plurality of OFDMA subcarriers for contention based access.

22. The device of claim 21, wherein said wireless messages with high access categories include at least one of voice messages and low-rate video messages.

23. The device of claim 21, wherein said request is transmitted in an association request or reassociation request frame.

24. The device of claim 21, wherein said subcarrier reservation map is received in at least one of an association response or reassociation response frame, a beacon frame and a probe response frame.

25. The device of claim 21, wherein said subcarrier reservation map is received for each physical layer protocol data unit (PPDU) inside signaling field of its physical layer convergence procedure (PLCP) preamble.

26. An apparatus, comprising:
means for receiving from at least one wireless device a request for at least one Orthogonal Frequency-Division Multiple Access (OFDMA) subcarrier, the at least one OFDMA subcarrier being a member of a group of OFDMA subcarriers occupying an available spectrum;
means for reserving at least one allocated OFDMA subcarrier to said at least one wireless device in response to said request, based on allocation criteria, for exchanging wireless messages comprising real-time traffic streams, with high access categories;
means for allocating a remaining portion of said available spectrum to a plurality of OFDMA subcarriers not including said at least one allocated OFDMA subcarrier, for contention based access by wireless receiving devices, for exchanging wireless messages with other access categories than said high access categories;
means for transmitting to the at least one wireless device a subcarrier reservation map designating said at least one allocated OFDMA subcarrier and said plurality of OFDMA subcarriers; and
means for transmitting at least one OFDMA symbol including said at least one allocated OFDMA subcarrier and at least one of said plurality of OFDMA subcarriers for contention based access.

27. An apparatus, comprising:
means for transmitting to a wireless access point a request for at least one Orthogonal Frequency-Division Multiple Access (OFDMA) subcarrier for delivering wireless messages comprising real-time traffic streams, with high access categories, the at least one OFDMA subcarrier being a member of a group of OFDMA subcarriers occupying an available spectrum;
means for receiving from said wireless access point a subcarrier reservation map designating at least one allocated OFDMA subcarrier for exchanging wireless messages comprising real-time traffic streams, with high access categories, and a plurality of OFDMA subcarriers occupying a remaining portion of said available spectrum not including said at least one allocated OFDMA subcarrier, for contention based access to deliver wireless messages with other access categories than said high access categories; and
means for receiving at least one OFDMA symbol including said at least one allocated OFDMA subcarrier and at least one of said plurality of OFDMA subcarriers for contention based access.

28. A computer program product, comprising:
a computer readable non-transitory storage medium storing computer program code which are executable in a computer processor;
program code in said computer readable non-transitory storage medium for receiving from at least one wireless device a request for at least one Orthogonal Frequency-Division Multiple Access (OFDMA) subcarrier, the at least one OFDMA subcarrier being a member of a group of OFDMA subcarriers occupying an available spectrum;
program code in said computer readable non-transitory storage medium for reserving at least one allocated OFDMA subcarrier to said at least one wireless device in response to said request, based on allocation criteria, for exchanging wireless messages comprising real-time traffic streams, with high access categories;
program code in said computer readable non-transitory storage medium for allocating a remaining portion of said available spectrum to a plurality of OFDMA subcarriers not including said at least one allocated OFDMA subcarrier, for contention based access by wireless receiving devices, for exchanging wireless messages with other access categories than said high access categories;
program code in said computer readable non-transitory storage medium for transmitting to the at least one wireless device a subcarrier reservation map designating said at least one allocated OFDMA subcarrier and said plurality of OFDMA subcarriers; and
program code in said computer readable non-transitory storage medium for transmitting at least one OFDMA symbol including said at least one allocated OFDMA subcarrier and at least one of said plurality of OFDMA subcarriers for contention based access.

29. A computer program product, comprising:
a computer readable non-transitory storage medium storing computer program code which are executable in a computer processor;
program code in said computer readable non-transitory storage medium for transmitting to a wireless access point a request for at least one Orthogonal Frequency-Division Multiple Access (OFDMA) subcarrier for delivering wireless messages comprising real-time traffic streams, with high access categories, the at least one OFDMA subcarrier being a member of a group of OFDMA subcarriers occupying an available spectrum;
program code in said computer readable non-transitory storage medium for receiving from said wireless access point a subcarrier reservation map designating at least one allocated OFDMA subcarrier for exchanging wireless messages comprising real-time traffic streams, with high access categories, and a plurality of OFDMA subcarriers occupying a remaining portion of said available spectrum not including said at least one allocated OFDMA subcarrier, for contention based access to deliver wireless messages with other access categories than said high access categories; and
program code in said computer readable non-transitory storage medium for receiving at least one OFDMA symbol including said at least one allocated OFDMA subcarrier and at least one of said plurality of OFDMA subcarriers for contention based access.

30. A system, comprising:
a wireless access point having a receiver;
at least one wireless device having a transmitter configured to transmit to said receiver in said wireless access point a request for at least one Orthogonal Frequency-Division Multiple Access (OFDMA) subcarrier for delivering wireless messages comprising real-time traffic streams, with high access categories, the at least one OFDMA subcarrier being a member of a group of OFDMA subcarriers occupying an available spectrum;
a processor in said wireless access point configured to reserve at least one allocated OFDMA subcarrier to said at least one wireless device in response to said request, based on allocation criteria, for exchanging wireless messages with high access categories;
said processor configured to allocate a remaining portion of said available spectrum to a plurality of OFDMA subcarriers not including said at least one allocated OFDMA subcarrier, for contention based access by wireless receiving devices, for exchanging wireless messages with other access categories than said high access categories;
a transmitter in said wireless access point configured to transmit to the at least one wireless device a subcarrier reservation map designating said at least one allocated OFDMA subcarrier and said plurality of OFDMA subcarriers;
a receiver in said at least one wireless device configured to receive from said wireless access point said subcarrier reservation map designating said at least one allocated OFDMA subcarrier and said plurality of OFDMA subcarriers occupying said remaining portion of said available spectrum not including said at least one allocated OFDMA subcarrier, for contention based access to deliver wireless messages with other access categories than said high access categories;
said transmitter in said wireless access point further configured to transmit at least one OFDMA symbol including said at least one allocated OFDMA subcarrier and at least one of said plurality of OFDMA subcarriers for contention based access; and
said receiver in said at least one wireless device further configured to receive said at least one OFDMA symbol including said at least one allocated OFDMA subcarrier and said at least one of said plurality of OFDMA subcarriers for contention based access.

* * * * *